(12) United States Patent
Yoshida et al.

(10) Patent No.: US 6,522,814 B2
(45) Date of Patent: Feb. 18, 2003

(54) WIRING OF OPTICAL COMMUNICATION CABLE TO BUILDINGS

(75) Inventors: Osamu Yoshida, Gyoda (JP); Hajime Tamura, Gyoda (JP); Fumihiro Akizuki, Gyoda (JP); Hideaki Tajima, Gyoda (JP)

(73) Assignee: Toyokuni Electric Cable Co., Ltd., Tokyo (JP)

( * ) Notice: Subject to any disclaimer, the term of this patent is extended or adjusted under 35 U.S.C. 154(b) by 0 days.

(21) Appl. No.: 09/874,604

(22) Filed: Jun. 5, 2001

(65) Prior Publication Data

US 2002/0181905 A1 Dec. 5, 2002

(51) Int. Cl.[7] ................................................. G02B 6/44
(52) U.S. Cl. ........................................ 385/100; 385/114
(58) Field of Search ............................ 385/100, 53, 54, 385/55, 103, 106, 112, 113, 114, 134, 135, 136, 137

(56) References Cited

U.S. PATENT DOCUMENTS

| | | | | |
|---|---|---|---|---|
| 4,807,962 A | * | 2/1989 | Arroyo et al. | 385/105 |
| 4,818,060 A | * | 4/1989 | Arroyo | 385/103 |
| 5,742,713 A | * | 4/1998 | Sanders et al. | 385/24 |
| 6,178,278 B1 | * | 1/2001 | Keller et al. | 385/109 |
| 6,341,188 B1 | * | 1/2002 | Serrander et al. | 385/114 |

FOREIGN PATENT DOCUMENTS

| | | | | |
|---|---|---|---|---|
| JP | 2001-51131 | * | 2/2001 | G02B/6/44 |
| JP | 2001-147359 A1 | * | 5/2001 | G02B/6/46 |

* cited by examiner

*Primary Examiner*—Lynn Field
*Assistant Examiner*—Michael C. Zarroli
(74) *Attorney, Agent, or Firm*—Jordan and Hamburg LLP

(57) ABSTRACT

Wirings of optical fiber cable to a building having at least one story including optical core wires or taped optical core wires including at least one wire for use on each story and at least one reserve wire for use on each story upon a change in demand. The wires are wired such that a center portion is situated at an upper portion of the building and both ends are situated at a lower portion of the building. A connector part is arranged in each story and connected to the optical core wires or taped optical core wires for use on that story.

15 Claims, 20 Drawing Sheets

WIRING OF OPTICAL COMMUNICATION CABLE TO BUILDINGS

FIELD OF THE INVENTION

The present invention is related to wiring of optical fiber cable to buildings such as office buildings.

BACKGROUND OF THE INVENTION

In buildings such as an office building, the predetermined tape core wire or taped optical core wire in a principal cable for optical-communications hung from the upper part of the building and connected to the precincts-optical cabinet PT, which is installed underground in the building, is also connected to the principal cable from outside of the building and connects to fuse together, mechanically and using connectors, with the precincts-cabinet PD which is installed in the predetermined story. In addition, an optical cable from the precincts-cabinet for each floor or story is connected with the network channel terminal equipment.

In the conventional principal cable which hangs in the building, it is customary to remove the sheath of a predetermined position in the installation spot and connect the taped core wire thereof to the precincts-cabinet PD. Therefore, the connector attachment, mechanical connection, etc. were performed at the installation spot, and there was a possibility that the work was problematic in that serious problems arose.

When a change in demand arose, i.e., an increase in demand for a circuit, additional wiring had to be installed, and there was a possibility that the work became complicated.

SUMMARY OF THE INVENTION

In light of the forgoing, it is an object of the invention to provide a wiring for optical communication cable to buildings that can be performed without complicated connection work using connector attachments etc. on the spot.

It is another object of the invention to provide a wiring arrangement for optical communication cable to a building including connectors which can be assembled at a factory and for which the principal cable can be wired using a branch implement that can be attached by comparatively easy work on the spot. In addition, the ratio of the number of optical core wires of the external wiring in reserve and the branch cable for the various stories in the building can be freely selected, so that when a change in demand arises and the increase in a circuit is needed, it can also be performed very easily.

Novel features which are believed to be characteristic of the invention, both as to its organization and method of operation, together with further objects and advantages thereof, are described below with reference to the accompanying drawings in which preferred embodiments of the invention are illustrated as an example.

It is to be expressly understood, however, that the drawings are for the purpose of illustration and description only, and are not intended as a definition of the limits of the invention.

DETAILED DESCRIPTION OF THE INVENTION

Figure 1:
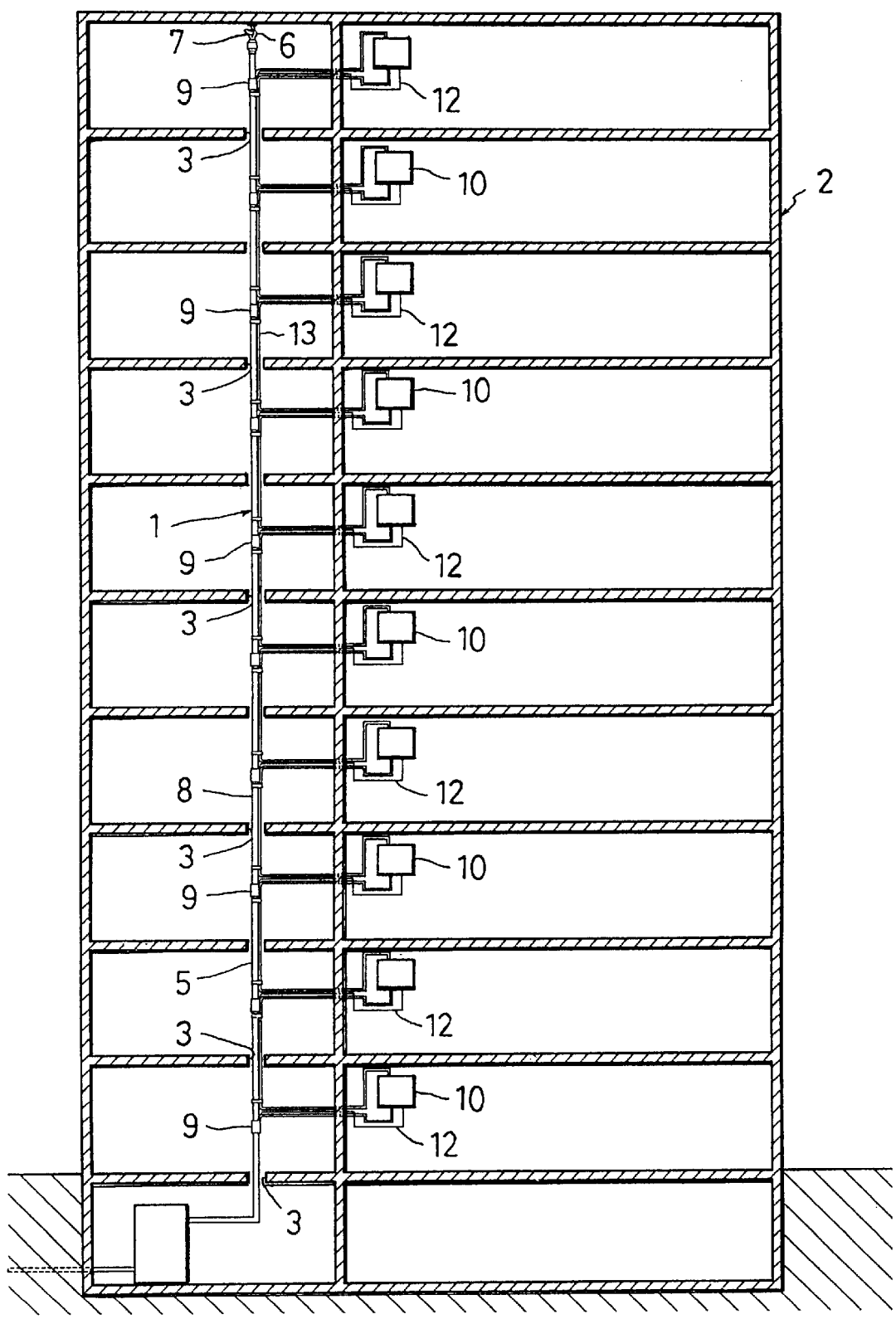
FIG. 1 is a view of a first embodiment of the present invention.
Figure 2:
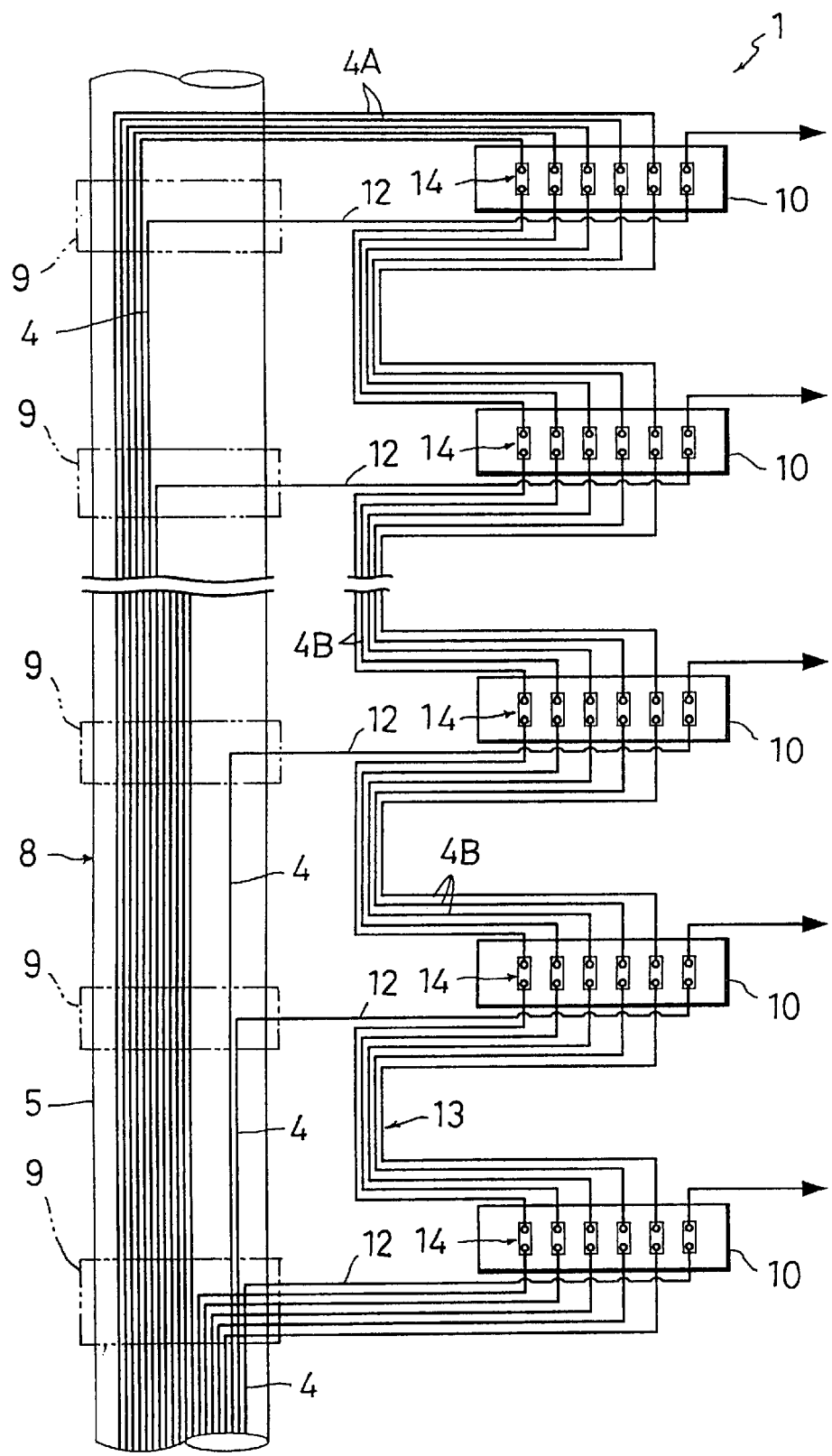
FIG. 2 is a schematic view showing the first embodiment of the present invention.
Figure 3:
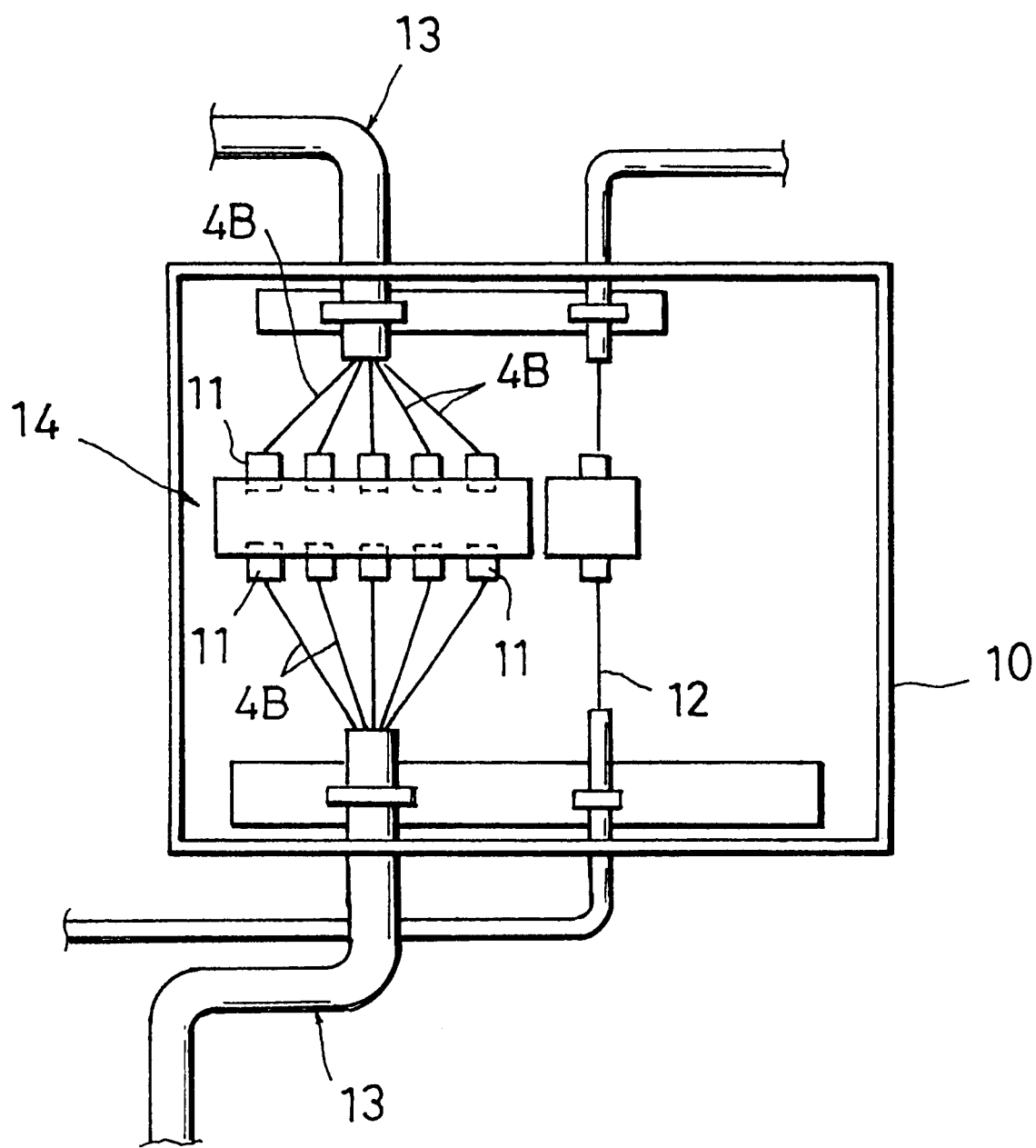
FIG. 3 is a view of a connector portion of the first embodiment of the present invention.

Preferred embodiments of the present invention are described in more detail below with reference to the accompanying drawings. An understanding of the present invention may be best gained by reference to FIGS. 1–3. FIGS. 1–3 illustrate a wiring of optical fiber cable to a building in accordance with a first embodiment of the present invention.

Reference numeral 1 shows the wiring of the optical fiber cable to a building 2 such as an office building. The wiring 1 is comprised of a principal cable 8 for optical communication, a plurality of branch cables 12, one for each floor or story, a plurality of external wirings 13 for reserve use (also referred to as reserve external wirings) and a plurality of connector parts 14.

The principal cable 8 is wired from an upper story of the building 2 to a lower story thereof so as to pass through holes 3 formed at a floor surface in each floor or story. The principal cable 8 is usually hung from the upper story. The principal cable 8 includes a plurality of optical core wires or taped optical core wires 4 and 4A for current use or for reserve to be used at the time of a change in demand. The wires 4,4A are covered by a sheath 5. Also, the principal cable 8 includes an engaging implement 6 provided at an upper portion thereof and which is engaged by a hanging implement 7 provided at the upper portion thereof to enable the principal cable 8 to hang from the upper story.

The plurality of branch cables 12, one for each story, are branched from the optical core wire or the taped optical core wire 4 of the principal cable 8 in each story or in a portion of each story using a branch implement 9 and are connected to an optical wiring box 10 at a connector 11.

The plurality of external wirings 13 for reserve use include optical core wire or taped optical core wire 4B having a lower end portion passed through the holes 3 formed in the floor surface of each story and wired in the lower part of the building 2. The wire 4B also has an upper end portion connected with the upper end of the reserve optical core wire or taped optical core wire 4A of the principal cable 8 by the connector 11.

The connector parts 14 are arranged in each story corresponding to the external wirings 13.

In the wiring 1 of the optical fiber cable to the building of the above-mentioned construction, the optical core wire or tape optical core wires 4 and 4A of a lower end of the principal cable 8 are connected in the connector to a terminal board (not shown) which in turn is connected to the external circuit, and the optical core wire of the lower part of the external wiring 13 or taped optical core wire 4B is connected with the connector 11.

In a situation where there is a change in demand, it can be handled by connecting a branch cable (not shown) to the connector connection part 14 of the part that the external wiring 13 needs.

Other embodiments of the present invention will now be described with reference to FIGS. 4–20. In FIGS. 4–20, the same components as in the first embodiment described above with reference to FIGS. 1–3 are designated by the same reference numerals and therefore will not be further explained in great detail.

Figure 4:
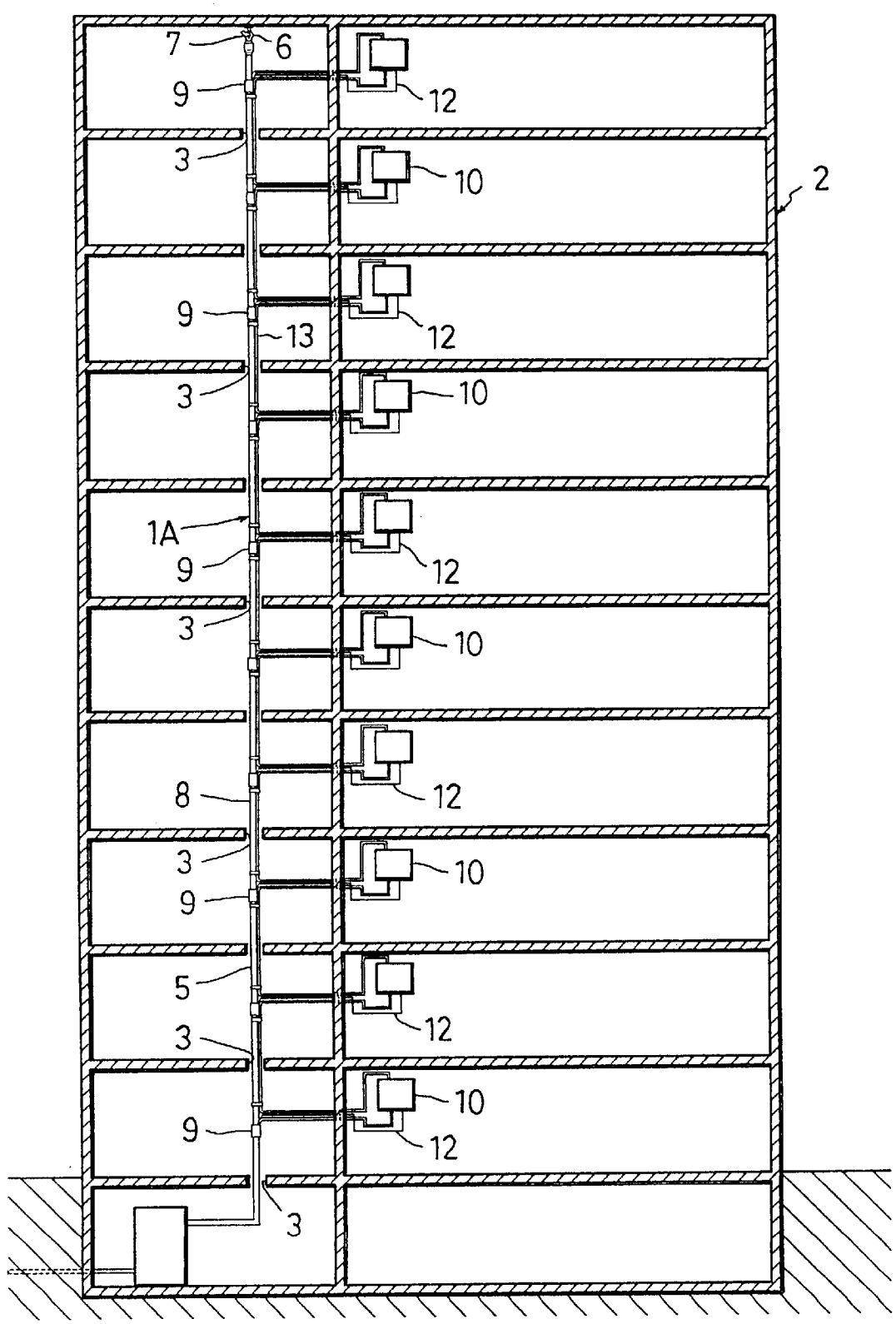
FIG. 4 is a view of a second embodiment of the present invention.
Figure 5:
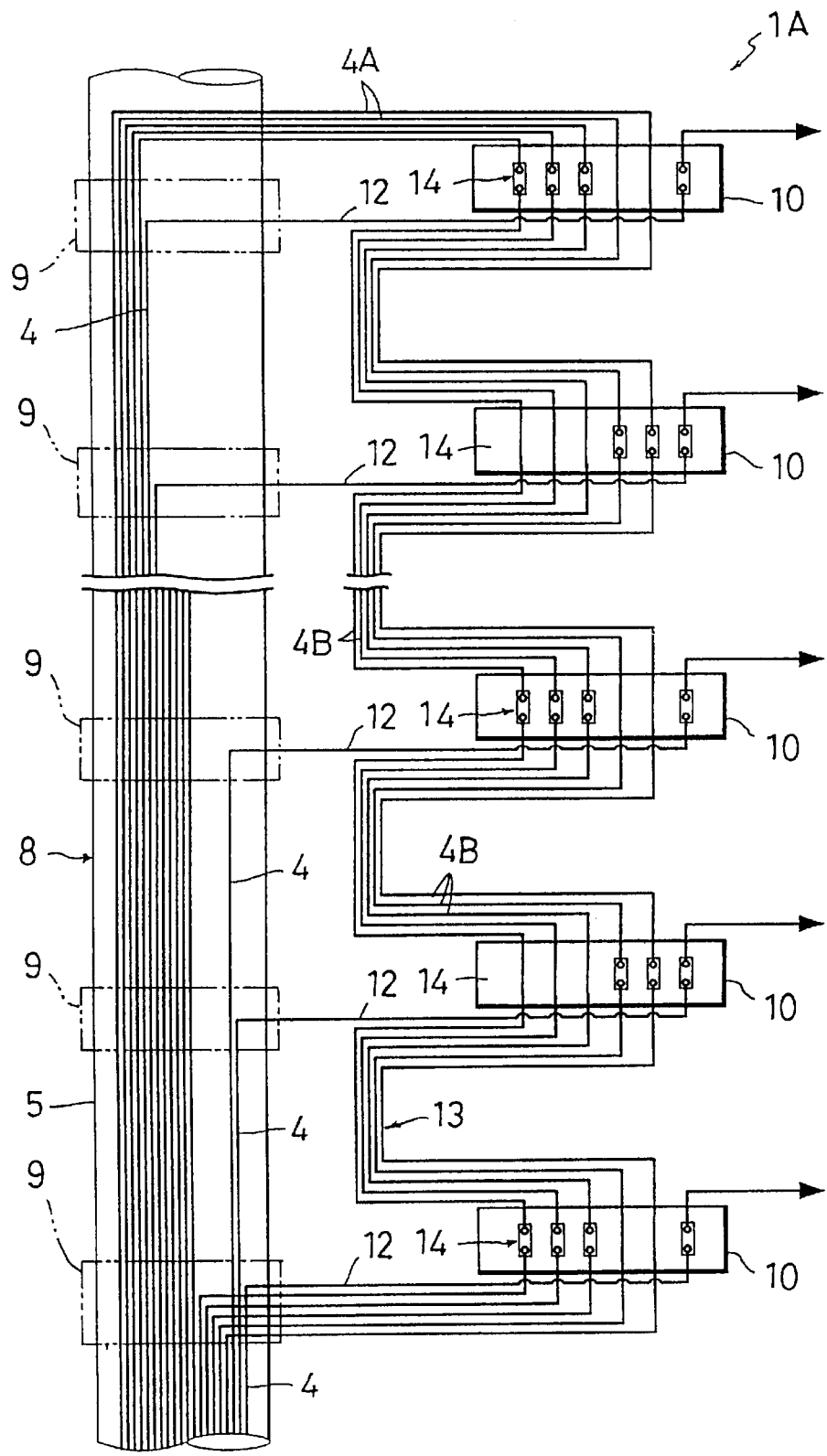
FIG. 5 is a schematic view of the second embodiment of the present invention.
Figure 6:
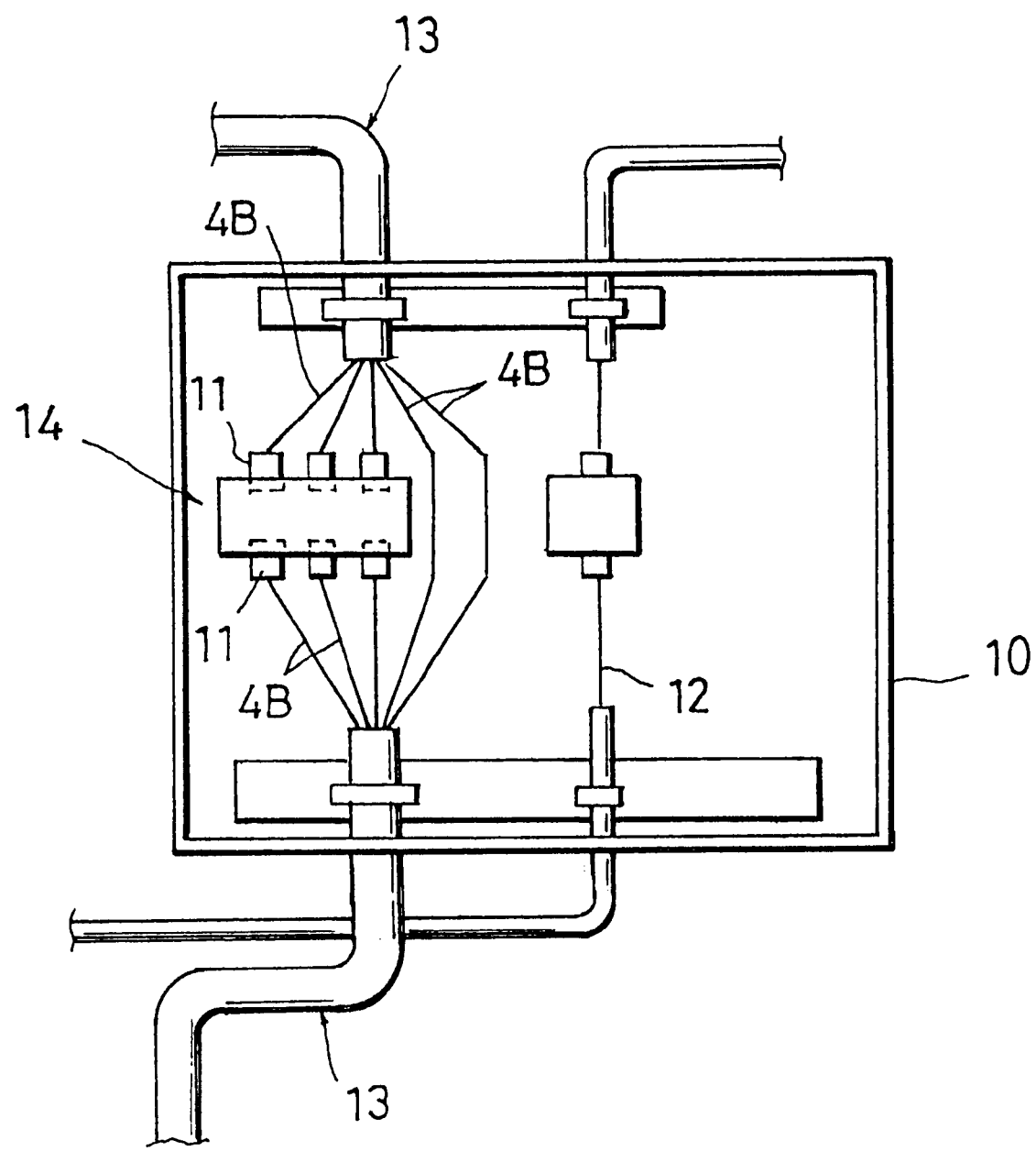
FIG. 6 is a view of a connector portion of the second embodiment of the present invention.

A second embodiment of the present invention is shown in FIGS. 4–6. It is distinguished from the first embodiment in that the connector connection parts 14 are arranged in a half optical core wire or taped core wire 4B for at least some if not every floor so that each connector connection part 14 might use a different external wiring 13 in reserve. Thus, the wiring 1A of the optical fiber cable to the building is performed so that the connector connection part 14 of the external wiring 13 can be reduced in half.

Figure 7:
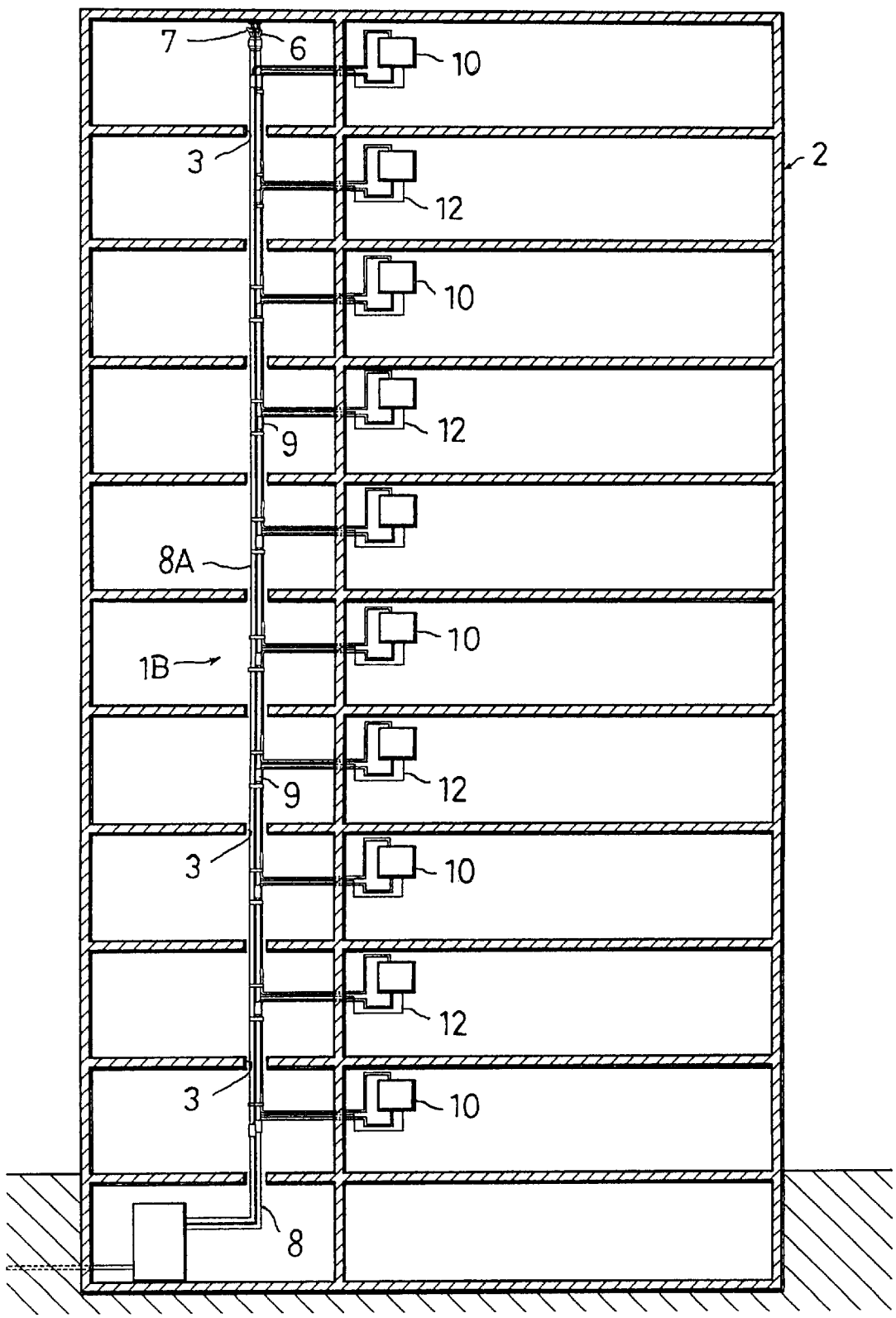
FIG. 7 is a view of a third embodiment of the present invention.
Figure 8:
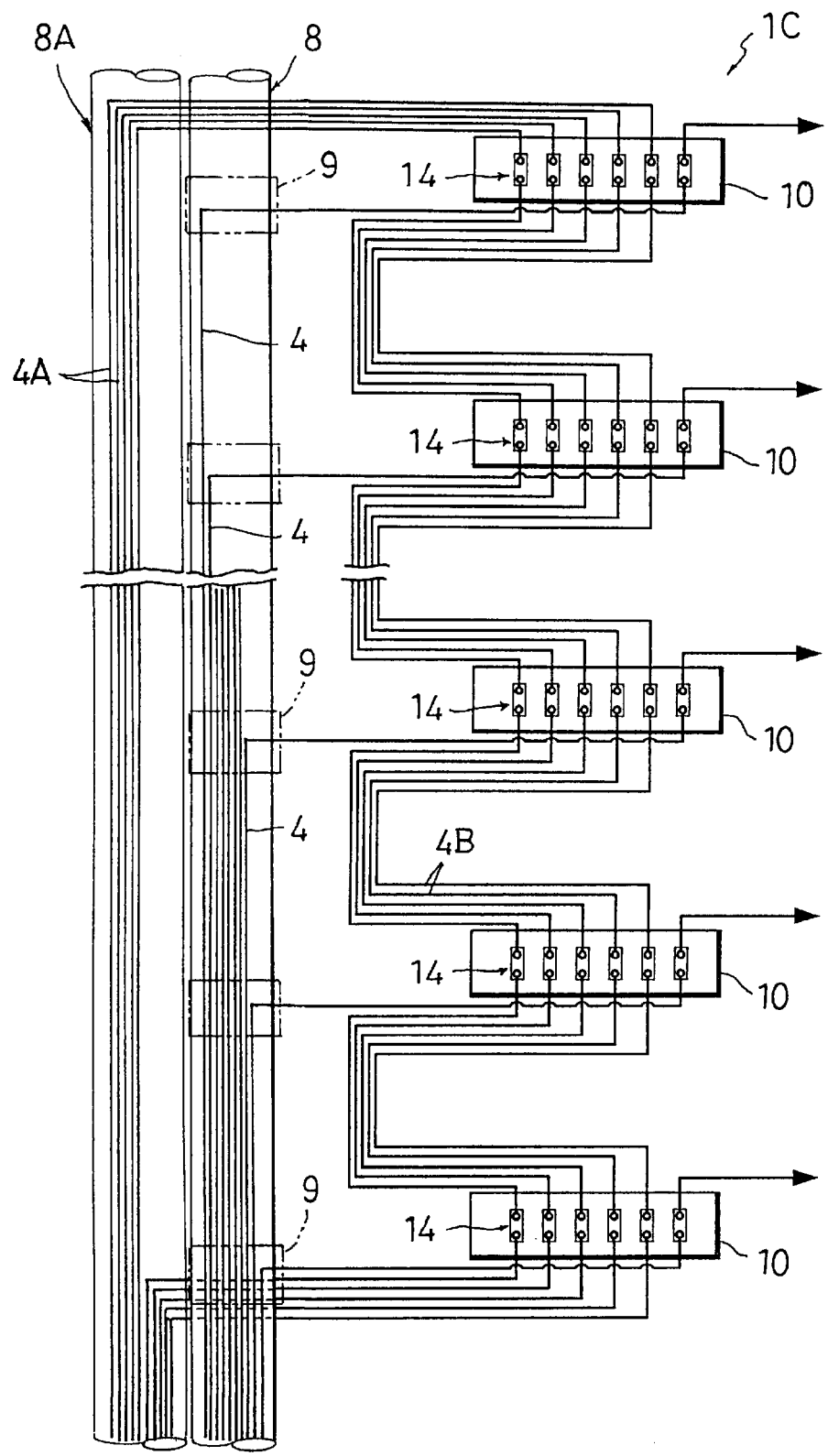
FIG. 8 is a schematic view of the third embodiment of the present invention.

A third embodiment of the present invention is shown in FIGS. 7 and 8. It is distinguished from the first embodiment in that the combination of the principal cable 8 for each story and a second, reserve principal cable 8A is used. Cable 8 houses the optical core wires or taped optical core wires 4 while cable 8A houses the reserve optical core wires or taped optical core wires 4A. A wiring 1B in accordance with the third embodiment has similar advantages to that according to the first embodiment.

Figure 9:
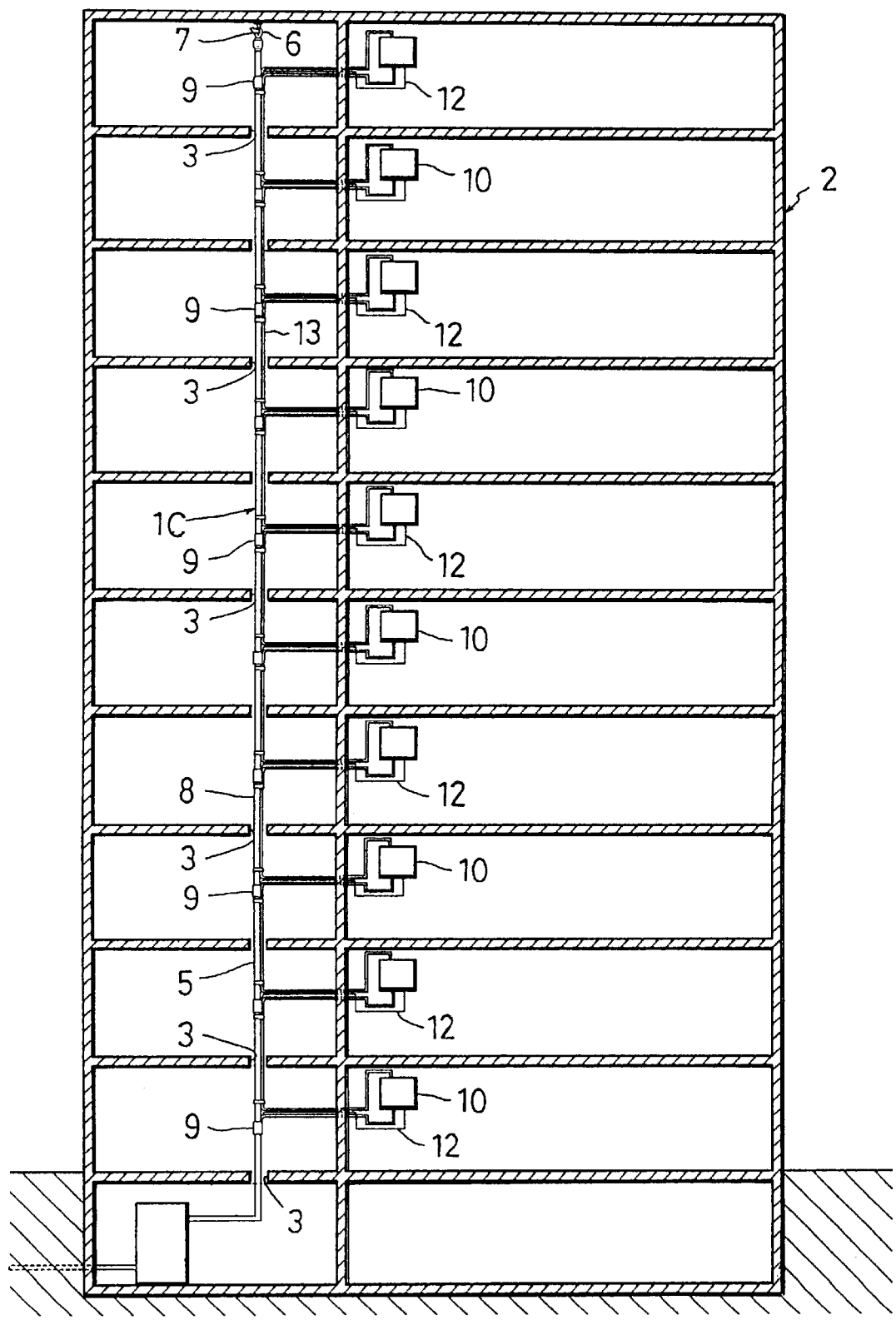
FIG. 9 is a view of a fourth embodiment of the present invention.
Figure 10:
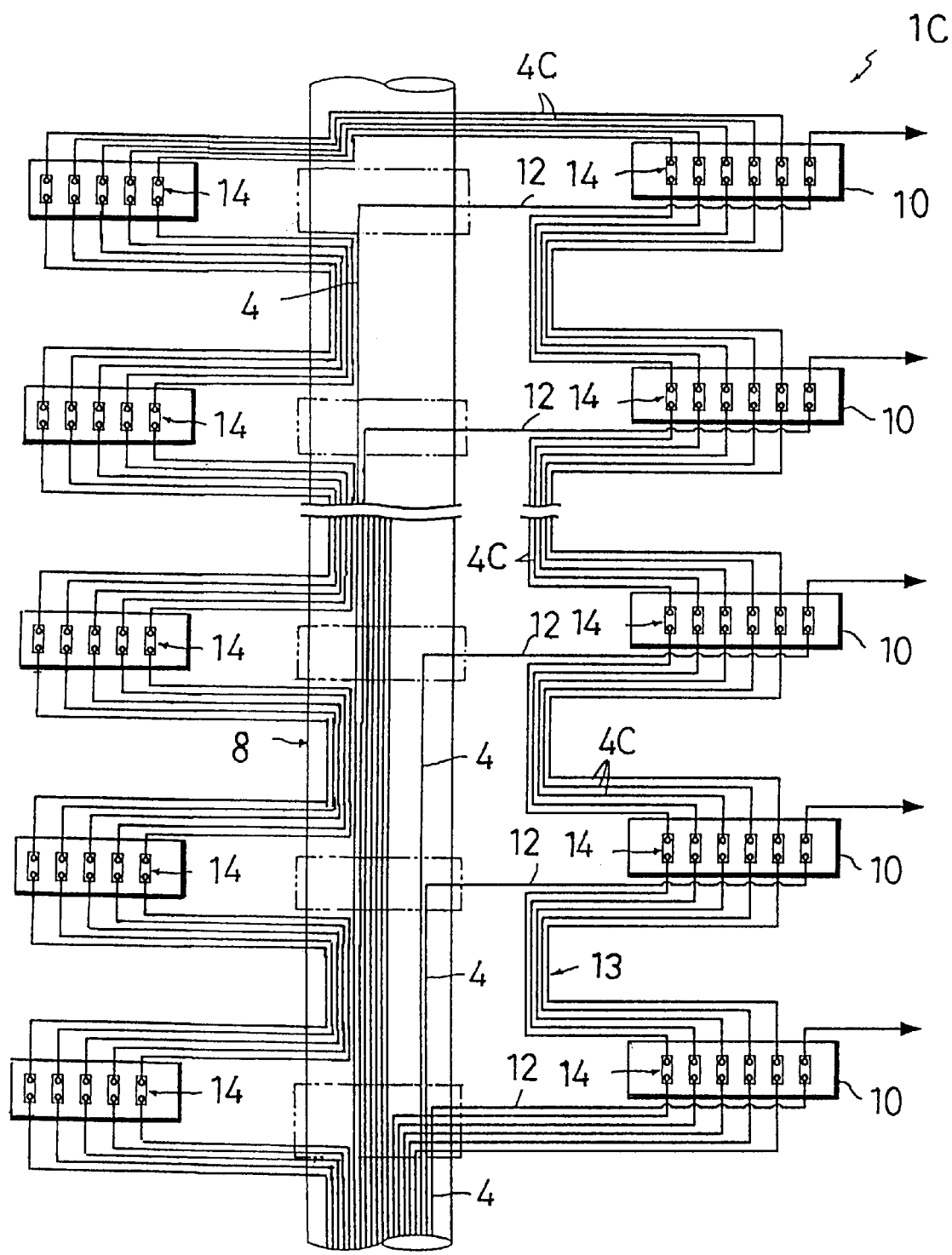
FIG. 10 is a schematic view of the fourth embodiment of the present invention.

A fourth embodiment of the present invention is shown in FIGS. 9 and 10. It is distinguished from the first embodiment in that the plurality of optical core wires or taped optical core wires 4 is replaced by another optical core wire or taped optical core wire 4C. The optical core wire or taped optical core wire 4C is for reserve use and is wired so as to be situated at the lower story by passing through the ends thereof into the hole 3 formed at the floor surface of each floor, respectively, and such that a substantially center portion thereof is placed near the hanging implement 7 provided at the upper portion of the building by the engaging implement 6. The connector connection parts 14 are arranged at each story of the optical core wire or taped optical core wire 4C respectively. In addition, the branch cables 12 are connected with the respective connector connection part 14 placed at each story. A wiring IC in accordance with the third embodiment has similar advantages to that according to the first embodiment.

Figure 11:
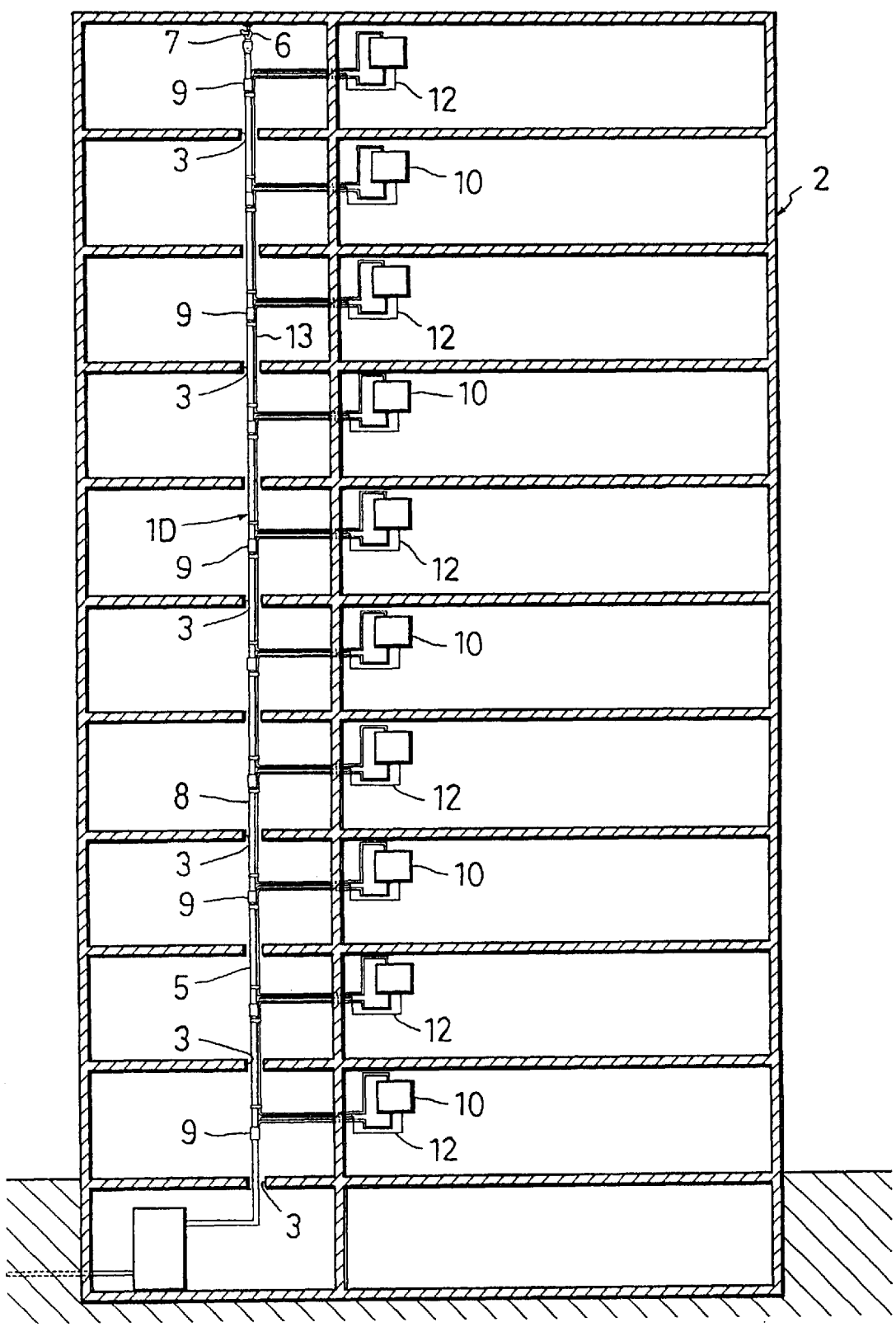
FIG. 11 is a view of a fifth embodiment of the present invention.
Figure 12:
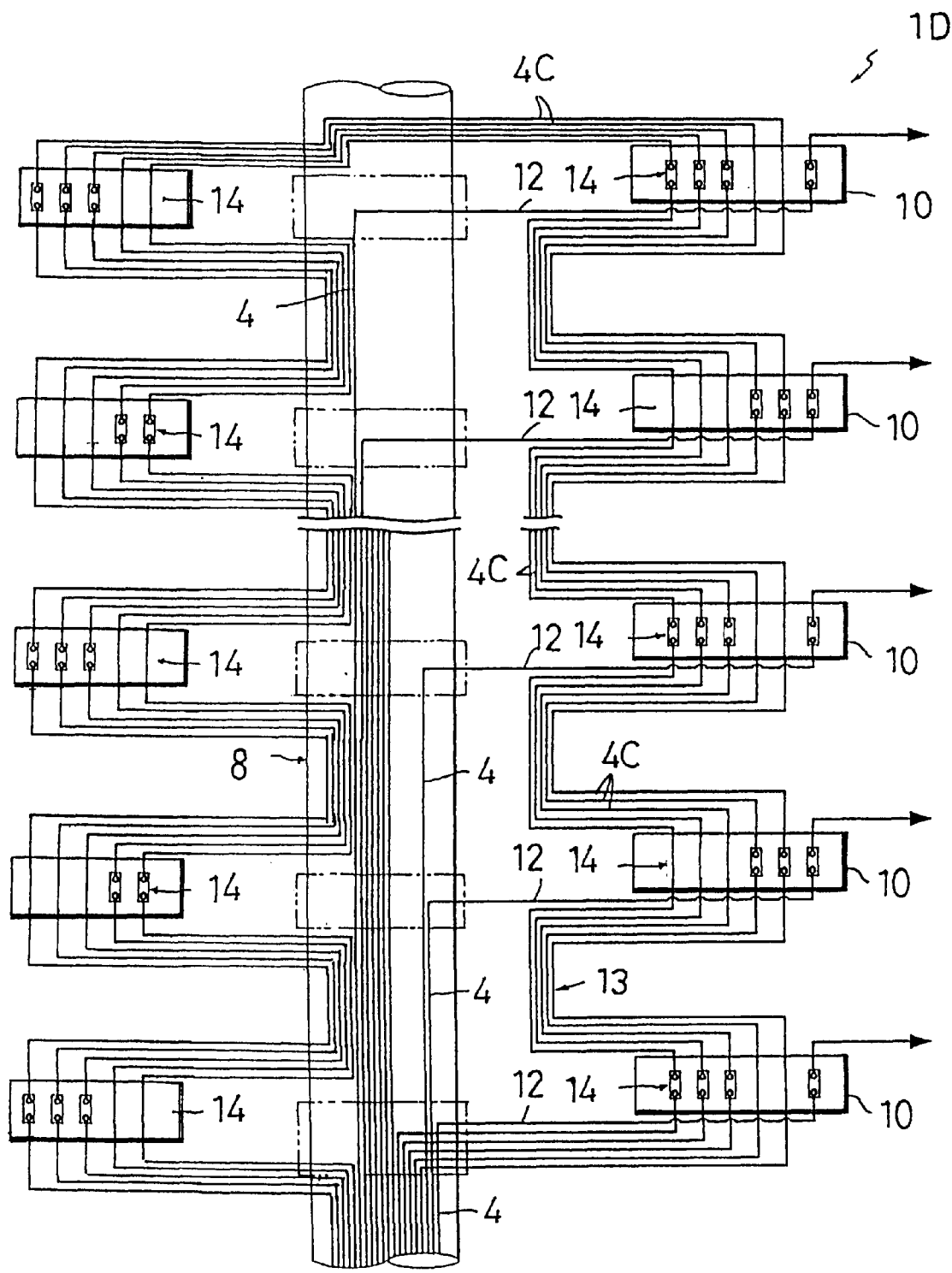
FIG. 12 is a schematic view of the fifth embodiment of the present invention.
Figure 13:
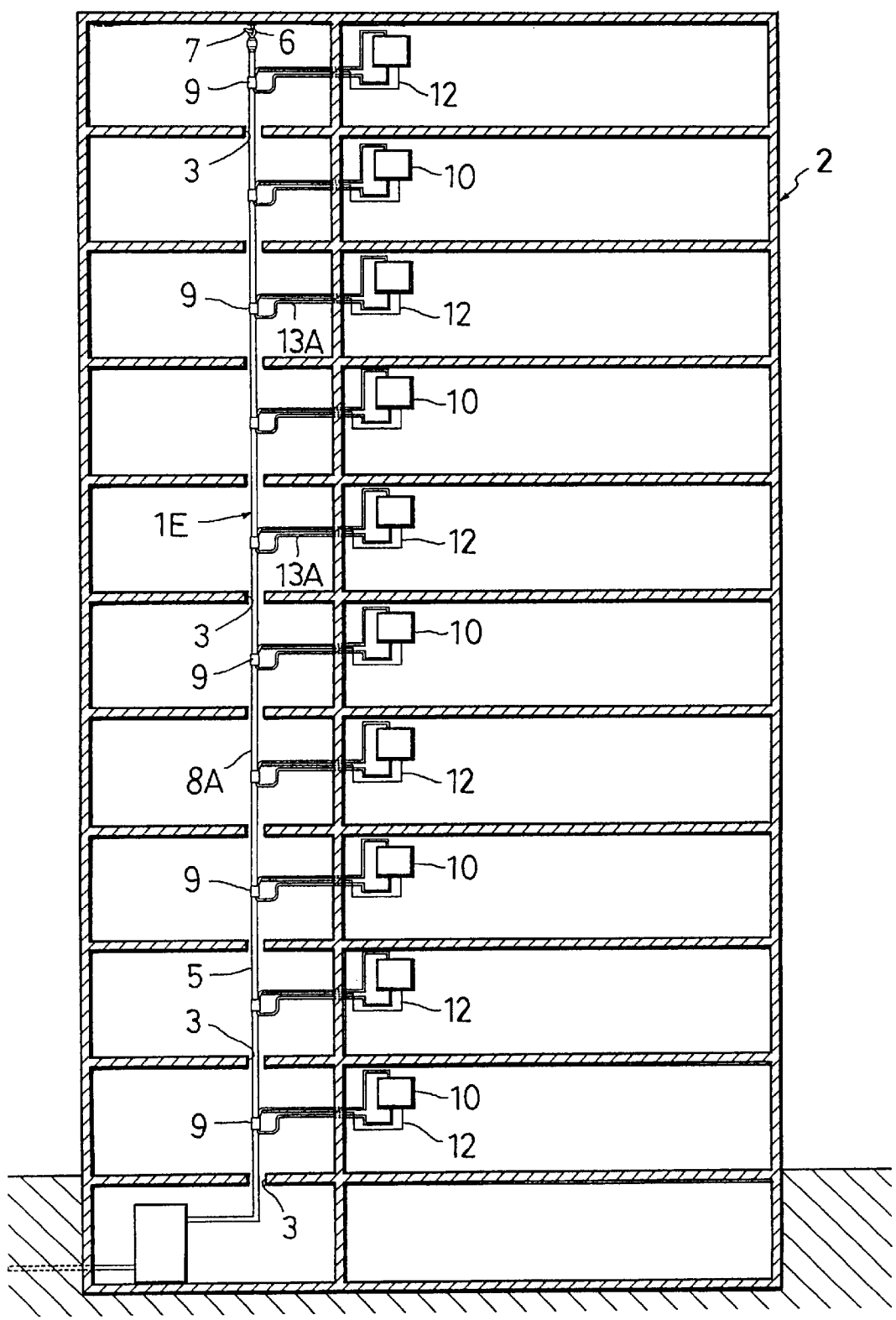
FIG. 13 is a view of a sixth embodiment of the present invention.
Figure 14:
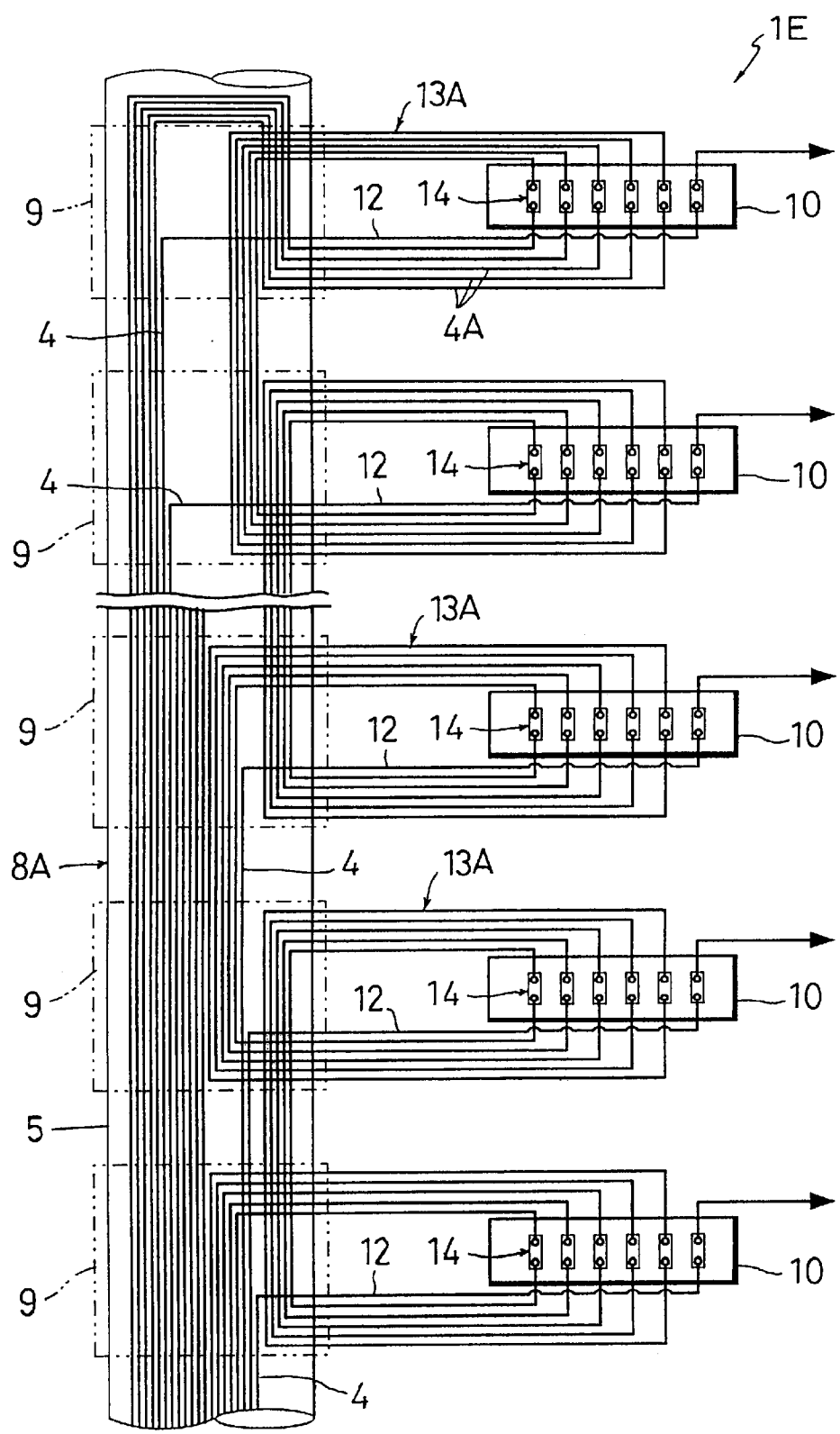
FIG. 14 is a schematic view of the sixth embodiment of the present invention.
Figure 15:
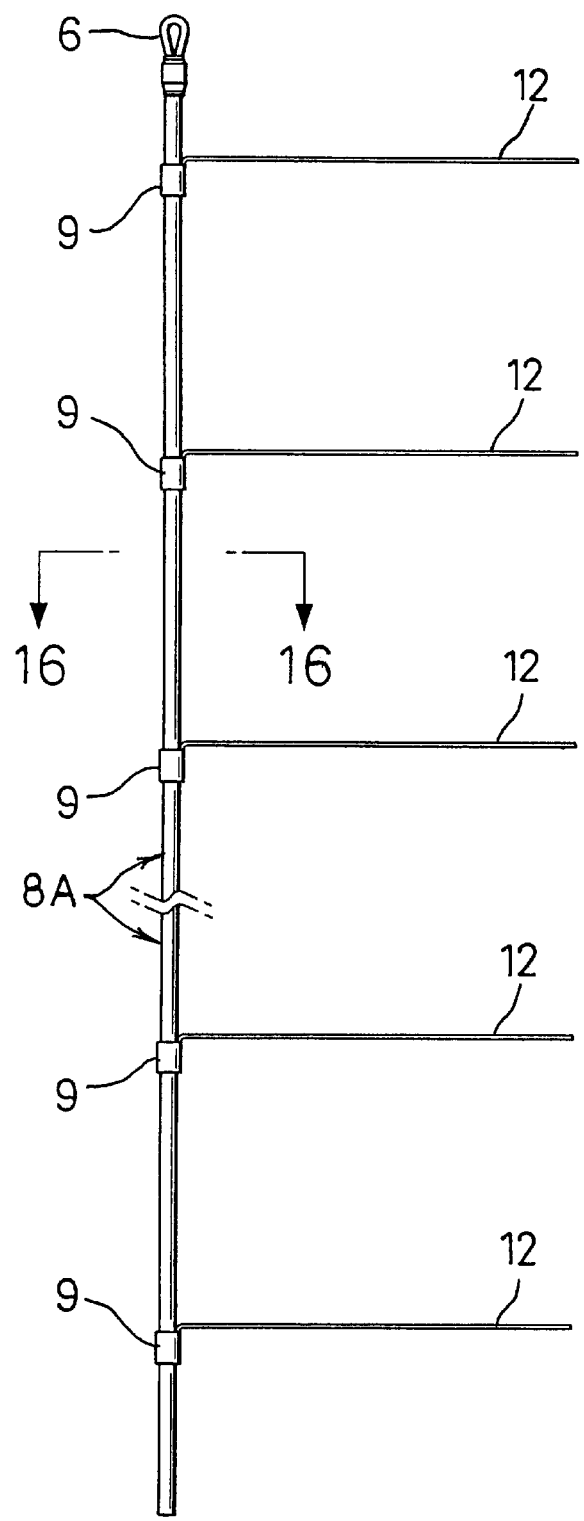
FIG. 15 is a view of an optical-communications principal cable of the sixth embodiment of the present invention.
Figure 16:
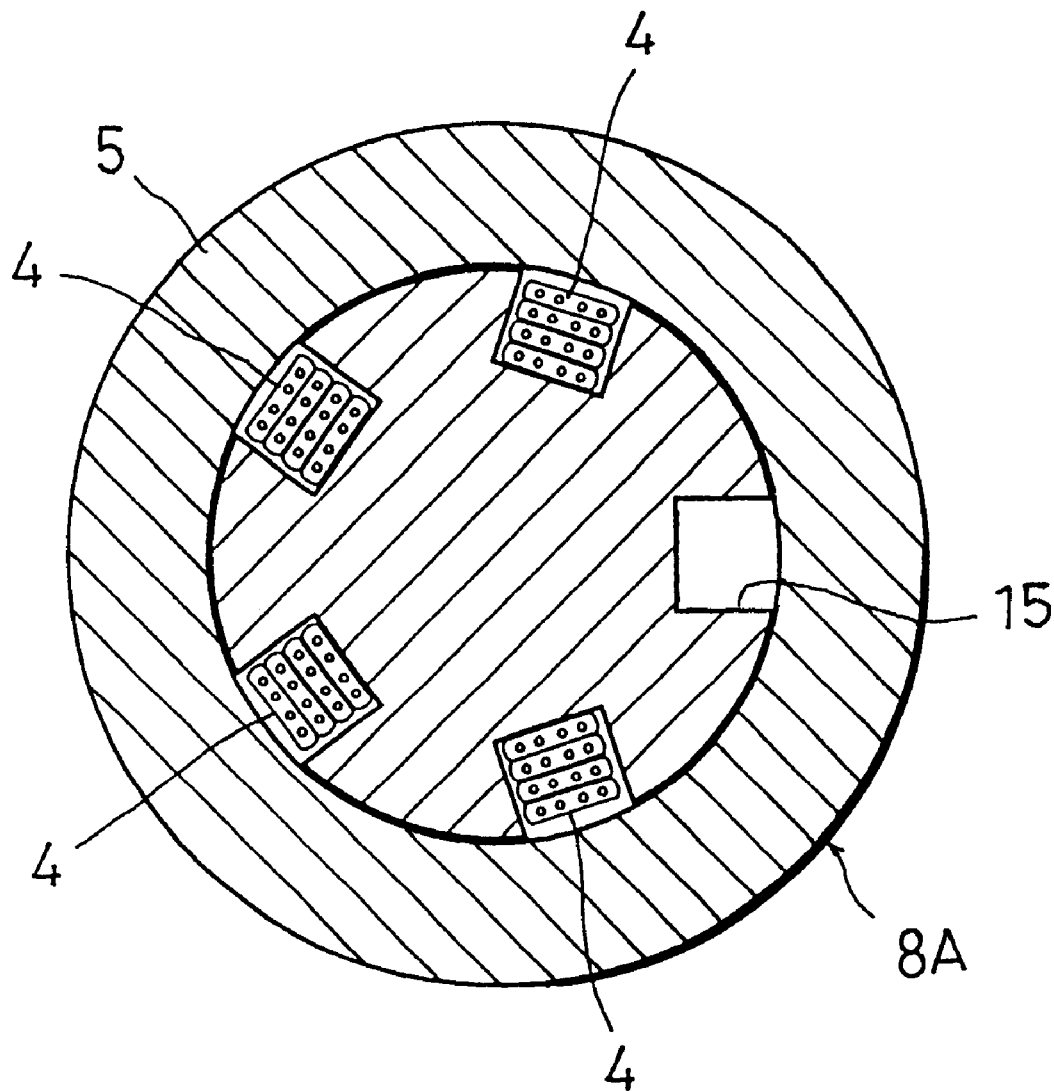
FIG. 16 is an expanded cross sectional view taken along the line 16—16 of FIG. 15.
Figure 17:
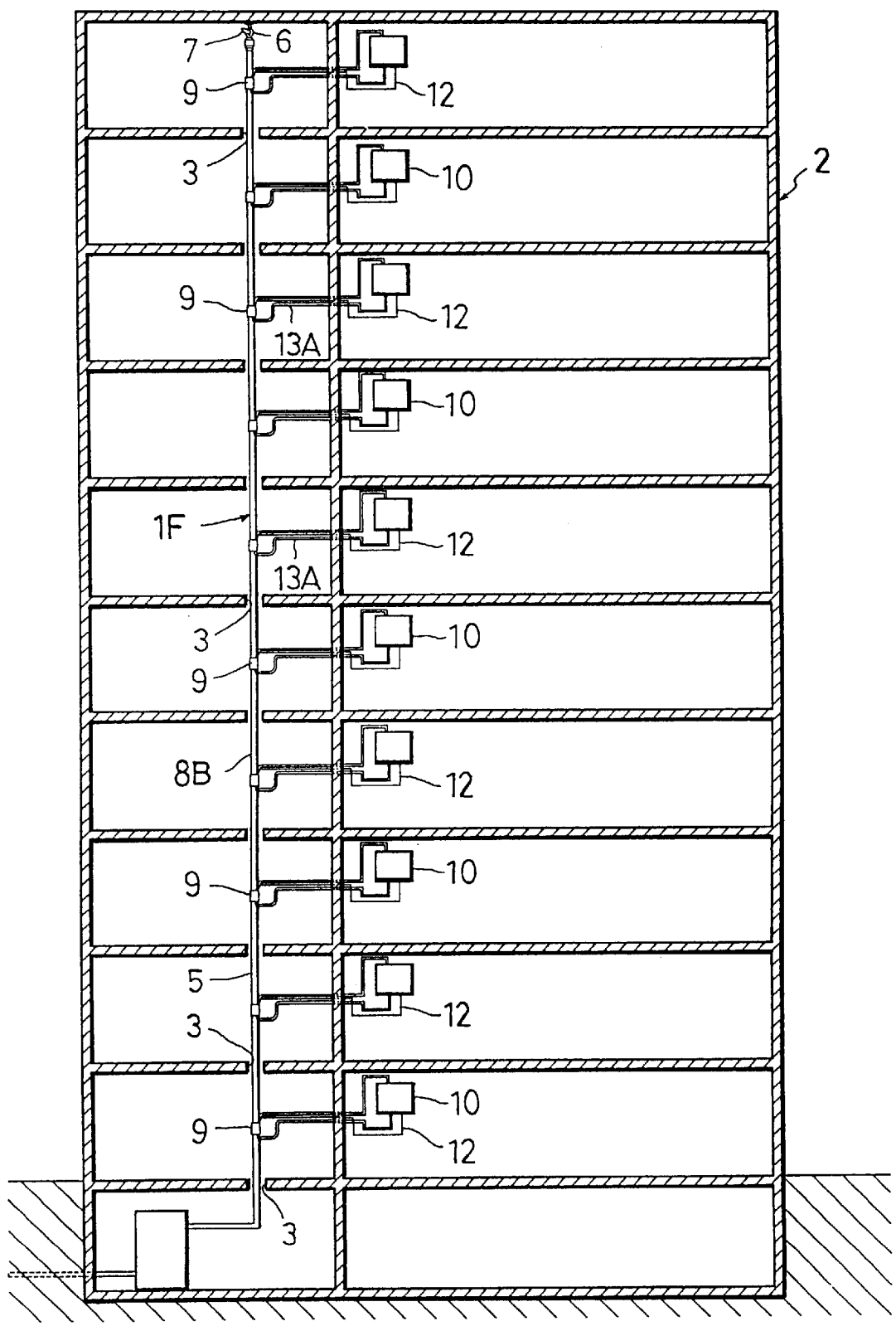
FIG. 17 is a view of a seventh embodiment of the present invention.
Figure 18:
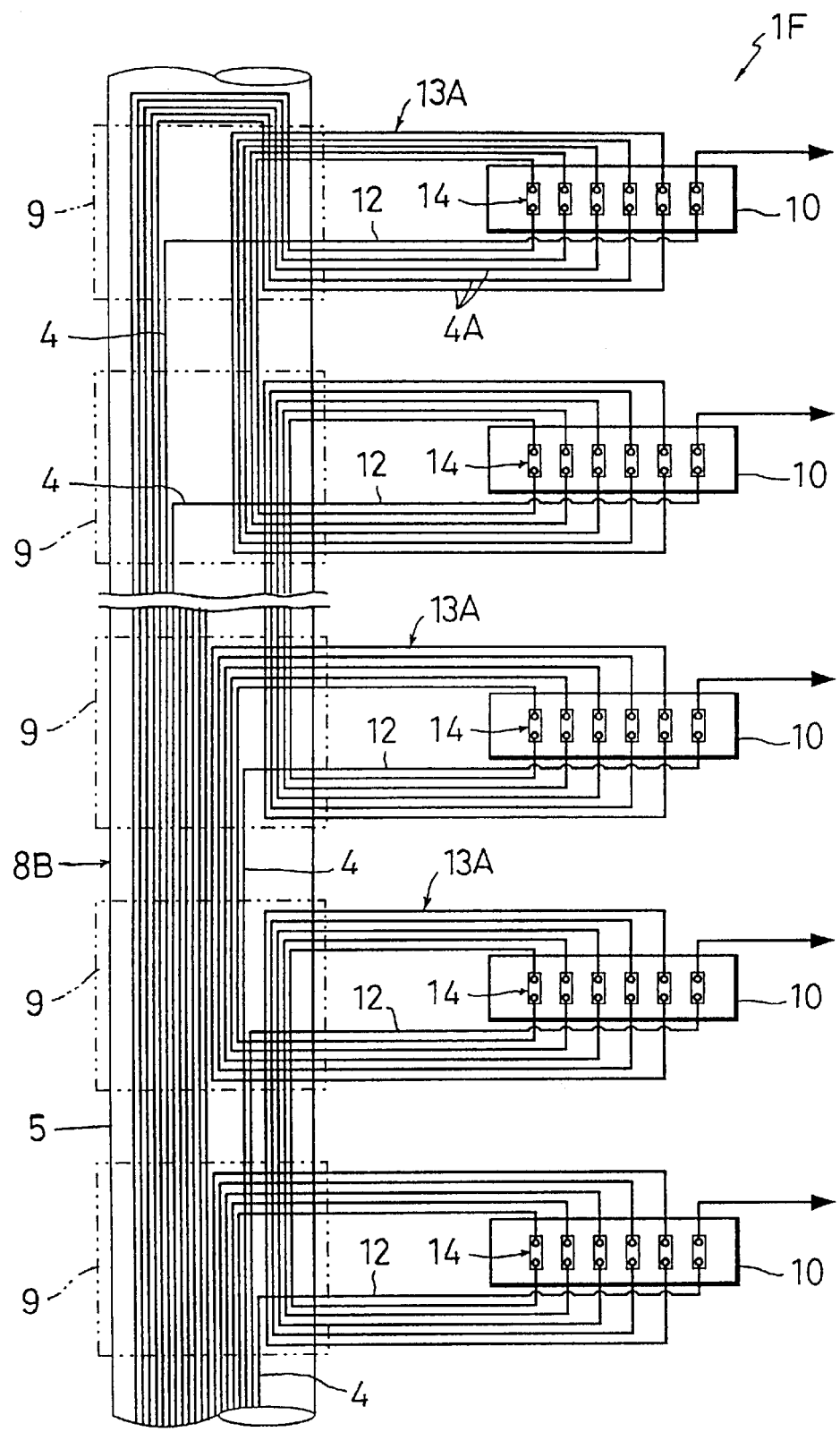
FIG. 18 is a schematic view of the seventh embodiment of the present invention.
Figure 19:
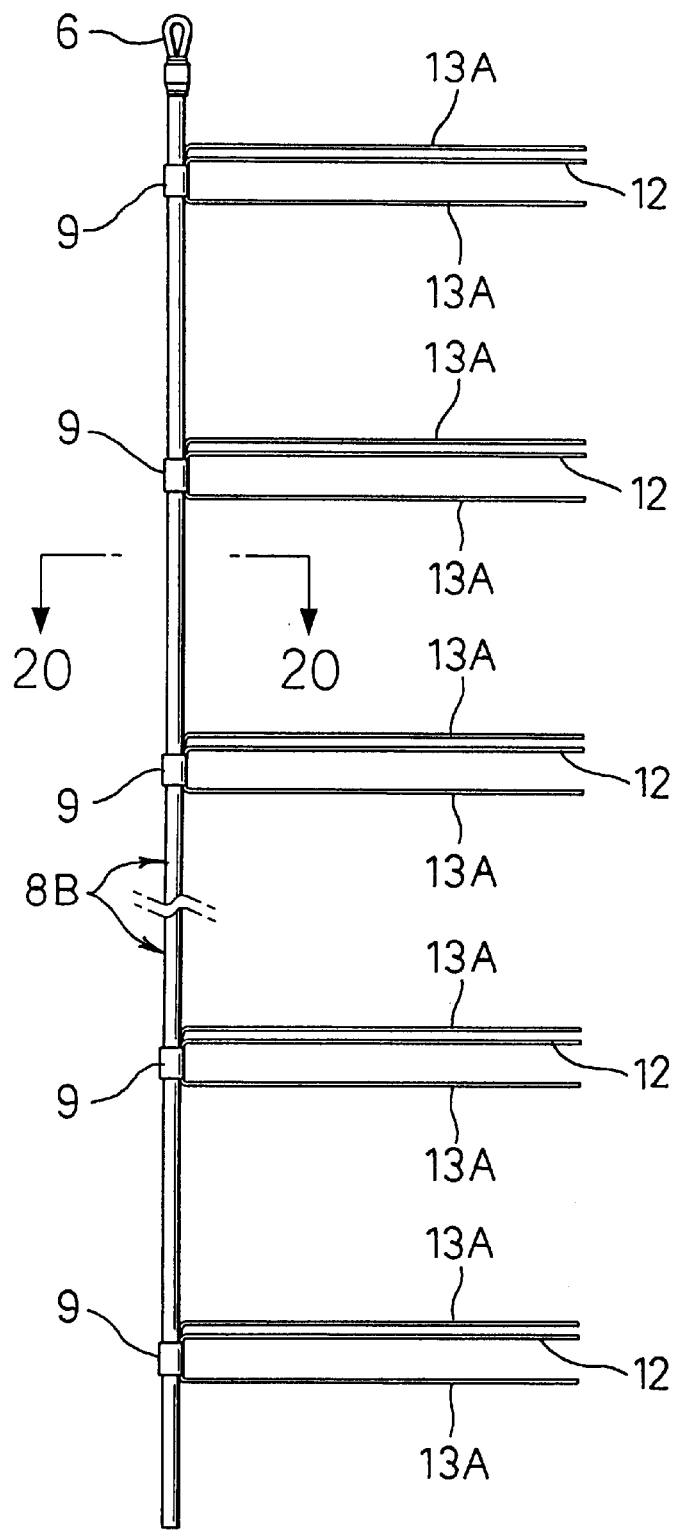
FIG. 19 is a view of an optical-communications principal cable of the seventh embodiment of the present invention.
Figure 20:
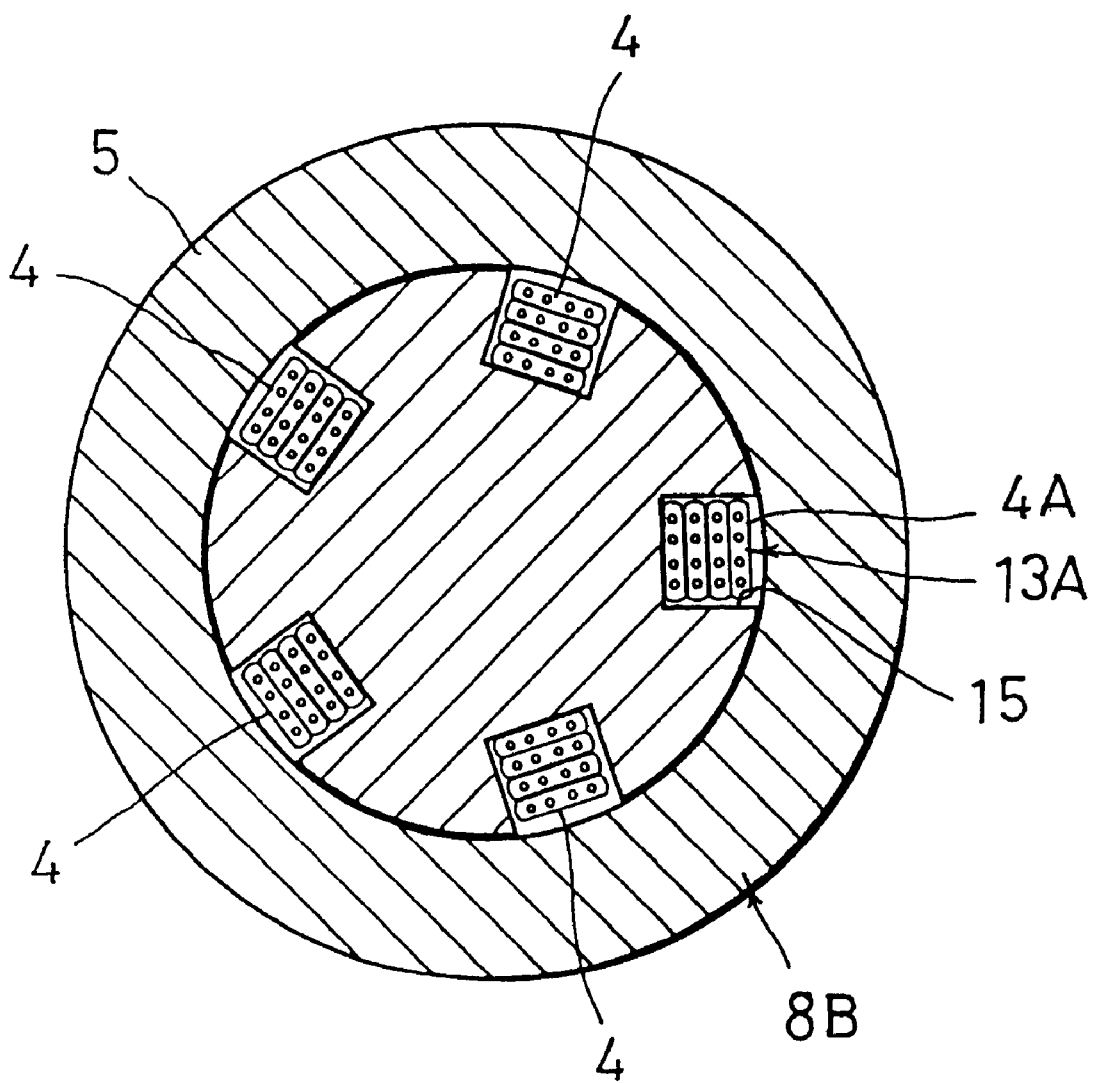
FIG. 20 an expanded cross sectional view taken along the line 20—20 of FIG. 19.

A fifth embodiment of the present invention is shown in FIGS. 11 and 12. It is distinguished from the fourth embodiment in that the connector connection parts 14 are arranged in a half optical core wire or taped optical core wire 4B for at least some if not every floor so that each connector connection part 14 might use a different external wiring 13 in reserve. A wiring 1D in accordance with the forth embodiment has similar advantages to that according to the first embodiment. Also the connector connection part 14 of the external wiring 13 can be reduced.

A sixth embodiment of the present invention is shown in FIGS. 13–16. It is distinguished from the first embodiment in that a principal cable 8A has an insertion hole 15 into the sheath 5. A plurality of reserve external wirings 13A includes the optical core wire or taped optical core wire 4A, both ends of which project outwardly from the external wiring insertion hole 15 of the sheath 5 and in addition, the insertion hole 15 is used in order to branch the branch cable 12 of the principal cable 8A and for connections with the connector 11 respectively. An upper connector 11 connects the upper end of the external wirings 13A and optical core wire or tape optical core wires 4A of the principal cable 8. The wiring 1E in accordance with the sixth embodiment has similar advantages to that according to the first embodiment. Also the wiring based on one principal cable 8A into the building can conduct.

A seventh embodiment of the present invention is shown in FIGS. 17–20. It is distinguished from the sixth embodiment in that a principal cable 8B covered with the sheath 5 is used so as to include the optical core wires or taped optical core wire 4 and external wiring insertion holes 15. A wiring IF with the principal cable 8B in accordance with the seventh embodiment has similar advantages to that according to the sixth embodiment.

As set forth above, the advantages of the invention are as follows:

(1) A wiring of the optical fiber cable to the buildings comprises a principal cable for optical communication extending from the upper portion of a building to the lower portion thereof, and which principal cable includes a plurality of optical core wires or taped optical core wires for use on each story with at least one being in reserve to be used at the time of a change in demand and which is covered by a sheath; a plurality of branch cables branched from the optical core wires or the taped optical core wires of the principal cable in each story; a plurality of external cables in reserve including optical core wire or taped optical core wire, having a lower end portion thereof wired downwardly in the lower part of the building, and having an upper end portion thereof connected with the upper end of the reserve optical core wire or taped optical core wire of the principal cable by a connector; and a plurality of connector parts interposed in each story corresponding to the external cables in reserve. Accordingly, the wiring work can be performed when a change in demand arises so that the branch cable is connected with the connector part of the reserve external wiring.

Therefore, the wiring work at the time of a change in demand is easy, and can be carried out in a short time.

(2) As discussed above, since the interrelationship of the components is easy, the system can be installed easily.

(3) As discussed above, since optical core wires or taped optical core wire of the external wiring are maintained in reserve and are wired in the shape of a loop, selective use of these reserve wires can be enabled easily and it can be used for two circuits by one.

(4) As discussed above, since the system can be wired on the basis of one principal cable, the expense of wiring work and the borrowing of a wiring floor can be managed with one shift, and are made cheaply.

What is claimed is:

1. A wiring of optical fiber cable to a building having at least one story comprising:
   a plurality of optical core wires or taped optical core wires including at least one wire for use on each story and at least one reserve wire for use on each story upon a change in demand, said wires being wired such that a center portion of said wires is situated at an upper portion of the building and both ends of said wires are situated at a lower portion of the building; and
   a plurality of connector parts each arranged in a respective one of the stories and connected to said optical core wires or taped optical core wires for use on said story.

2. The wiring of claim 1, further comprising a sheath covering said optical core wires or taped optical core wires.

3. The wiring of claim 1, further comprising a hanging device for hanging an upper end of said optical cover wires or taped optical core wires at an upper portion of the building.

4. The wiring of claim 1, further comprising a plurality of branch cables, each arranged on a respective one of the stories for connecting a respective one of said optical core wires or taped optical core wires to a respective one of said connector parts.

5. The wiring of claim 1, wherein said plurality of optical core wires or taped optical core wires includes a plurality of reserve wires.

6. The wiring of claim 1, wherein said plurality of optical core wires or taped optical core wires includes a plurality of wires for use, each for use on a different story or for use on a discrete portion of a story.

7. The wiring of claim 1, further comprising at least one reserve external wiring including at least one optical core wire or taped optical core wire, said at least one reserve external wiring being connected to said at least one reserve wire at one of said connector parts.

8. The wiring of claim 1, further comprising a plurality of reserve external wiring each including at least one optical core wire or taped optical core wire, each of said reserve external wiring being connected to a respective one of said at least one reserve wire at one of said connector parts.

9. The wiring of claim 1, further comprising a first cable housing said at least one wire and a second cable housing said at least one reserve wire.

10. A wiring of optical fiber cable to a building having at least one story comprising:
    a principal cable for optical communication including a plurality of optical core wires or taped optical core wires, external wiring insertion holes for external wiring and a sheath for covering said plurality of optical core wires or the taped optical core wires, said optical core wires or the taped optical core wires including at least one wire for use on each story and at least one reserve wire for use on each story upon a change in demand;
    a plurality of connector each arranged in a respective one of the stories and connected to said optical core wires or taped optical core wires for use on said story;
    a plurality of branch cables each branched from the optical core wires or the taped optical core wires of the principal cable at a respective one of the stories or at a portion of a respective one of the stories;
    a plurality of reserve external wirings including an optical core wire or taped optical core wire, both ends of each of said reserve external wirings projecting outward from said external wiring insertion hole and each of said reserve external wirings extending between said sheath of said principal cable and a respective one of said connectors; and
    an upper connector connecting an upper end of said reserve external wirings and an upper end of said at least one reserve wire in said principal cable.

11. The wiring of claim 10, further comprising a hanging device for hanging an upper end of said principal cable at an upper portion of the building.

12. A wiring of optical fiber cable to a building having at least one story comprising:
    a principal cable for optical communication including a plurality of optical core wires or taped optical core wires for each story, external wiring insertion holes for external wiring and a sheath for covering said optical core wires or taped optical core wires;
    a plurality of connector each arranged in a respective one of the stories and connected to said optical core wires or taped optical core wires for use on said story;
    a plurality of branch cables each branched from said optical core wires or said taped optical core wires of said principal cable at a respective one of the stories or at a portion of a respective one of the stories; and
    a plurality of reserve external wirings including an optical core wire or taped optical core wire, both ends of each of said reserve external wirings projecting outward from said external wiring insertion hole and each of said reserve external wirings extending between said sheath of said principal cable and a respective one of said connectors.

13. The wiring of claim 12, further comprising a hanging device for hanging an upper and of said principal cable at an upper portion of the building.

14. A wiring of optical fiber cable to a building having at least one story, comprising:
    a principal cable for optical communication including a plurality of optical core wires or taped optical core wires and a sheath for covering said optical core wires or taped optical core wires, said optical core wires or the taped optical core wires including at least one wire for use on each story and at least one reserve wire for use on each story upon a change in demand;
    a plurality of branch cables each branched from a respective one of said optical core wires or taped optical core wires of said principal cable at a respective one of the stories or at a portion of a respective one of the stories;
    a plurality of reserve external cables including at least one reserve optical core wire or taped optical core wire, each of said reserve external cables having a lower end portion wired in a lower part of the building and an upper end portion connected with an upper end of said at least one reserve optical core wire or taped optical core wire of said principal cable by a connector; and
    a plurality of connector parts each arranged in a respective one of the stories and connected to said reserve optical core wires or taped optical core wires on said story.

15. A wiring of optical fiber cable to a building having at least one story, comprising:

a first principal cable for optical communication including a plurality of optical core wires or taped optical core wires for each story and a sheath for covering said optical core wires or taped optical core wires;

a plurality of branch cables each branched from a respective one of said optical core wires or taped optical core wires of said first principal cable at a respective one of the stories or at a portion of a respective one of the stories;

a second principal cable for optical communication including a plurality of optical core wires or taped optical core wires for each story for use upon a change in demand and a sheath for covering said optical core wires or taped optical core wires;

a plurality of reserve external cables including at least one reserve optical core wire or taped optical core wire, each of said reserve external cables having a lower end portion wired in a lower part of the building and an upper end portion connected with an upper end of said at least one reserve optical core wire or taped optical core wire of said first principal cable by a connector; and a plurality of connector parts each arranged in a respective one of the stories and connected to said reserve optical core wires or taped optical core wires on said story.

* * * * *